Figure 1:
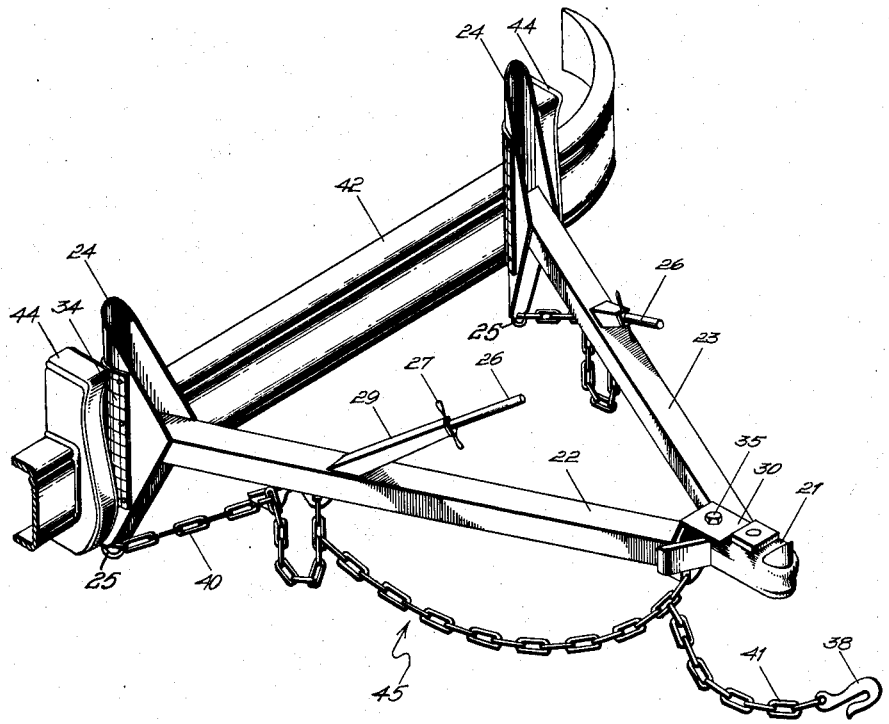

Jan. 8, 1963 T. W. SAFFORD 3,072,419
TOW BAR ASSEMBLY
Filed May 31, 1961 3 Sheets-Sheet 1

INVENTOR
THOMAS W. SAFFORD

BY John Gibson Semmes

ATTORNEY

Jan. 8, 1963  T. W. SAFFORD  3,072,419
TOW BAR ASSEMBLY

Filed May 31, 1961  3 Sheets-Sheet 2

INVENTOR
THOMAS W. SAFFORD
BY *John Gibson Semmes*
ATTORNEY

Jan. 8, 1963 T. W. SAFFORD 3,072,419
TOW BAR ASSEMBLY

Filed May 31, 1961 3 Sheets-Sheet 3

INVENTOR
*THOMAS W. SAFFORD*
BY *John Gibson Semmes*
ATTORNEY

United States Patent Office 3,072,419
Patented Jan. 8, 1963

3,072,419
TOW BAR ASSEMBLY
Thomas W. Safford, 758 Layton St., Santa Clara, Calif.
Filed May 31, 1961, Ser. No. 113,687
5 Claims. (Cl. 280—406)

The present invention relates to a tow bar assembly, particularly an assembly of the type which is used in connection with the towing of automobiles and like vehicles.

The present invention has particular adaptability in the rental industry wherein the vehicle to be towed more often than not is pulled by another vehicle which does not have permanently installed towing hitch apparatus and is driven by persons unskilled in such towing. Numerous previous inventors have attempted to devise means for securely attaching such vehicles to the rear of towing vehicles. Many of these devices have included a pair of tow bars diverging from a ball socket coupling. More often than not such tow bars have been connected laterally by means of a cross beam or the like and ends of these two bars have been adapted for positioning against or clamping upon the rear bumper of the towed vehicle. Chain means have been used to grab the towed vehicle bumper or bumper support. For the most part conventional tow bars have relied upon the strength of the towed vehicle bumped, rather than the towed vehicle frame for support. Also, a principal shortcoming of these devices has been the lack of any means for securely tensioning the chain and thus securely fitting the hitch to the towed car bumper. Also, means have not been provided for adjusting the level of the tow bar with the result that there is an unevenness of ride whenever the towed vehicle is carrying exceptional loads, or the towing vehicle, itself, is not level with the towed vehicle.

Significantly, none of the previous devices have been able to impart a downward thrust in the tow bar. As a result, whenever the towing vehicle has come to a sudden stop there has tended to be imparted an upward thrust in the tow bar with the resultant jackknifing of the towed vehicle beneath the towing vehicle rear.

The present two bar assembly eliminates jackknifing, since tensioning of the chain imparts a downward thrust in the tow bar. This downward thrust stabilizes the heights of the two vehicles. When the towing vehicle rear end rises the towed vehicle front end will rise correspondingly, since the chain tensioning has thrust the towing vehicle rear and the towed vehicle front to equal levels.

The lateral connection between conventional tow bars has precluded adaptability of the tow bars ends for positioning between variously sized bumper guards. Adaptability of the present two bar assembly is, in this respect provided by horizontally pivoting one tow bar with respect to the other.

Accordingly, it is an object of invention to provide a tow bar assembly which can be operated by unskilled persons for towing of vehicles without the dangers inherent in conventional tow bar assemblies.

Another object of invention is to provide a tow bar assembly wherein there are provided means for finely tensioning the chains which are used to interconnect the towing vehicle and the towed vehicle.

Another object of invention is to provide a tow bar assembly wherein a downward thrust may be imparted to the tow bar.

Another object of invention is to provide a tow bar assembly which is adjustable to insure a level riding position of the tow bar intermediate the towing and towed vehicles.

Yet another object of invention is to provide a tow bar assembly wherein one of the tow bars is pivoted horizontally with respect to a coupling end of the tow bar arm.

Another object of invention is to provide a tow bar assembly wherein two unitary and intersecting chain means are employed to clasp the towing vehicle to the towed vehicle.

Yet additional objects of invention will become apparent from the ensuing specification and attached drawings wherein:

FIG. 1 is a perspective of the present tow bar assembly mounted adjacent a towed car front bumper and presented for coupling to a towing vehicle.

Figure 2:
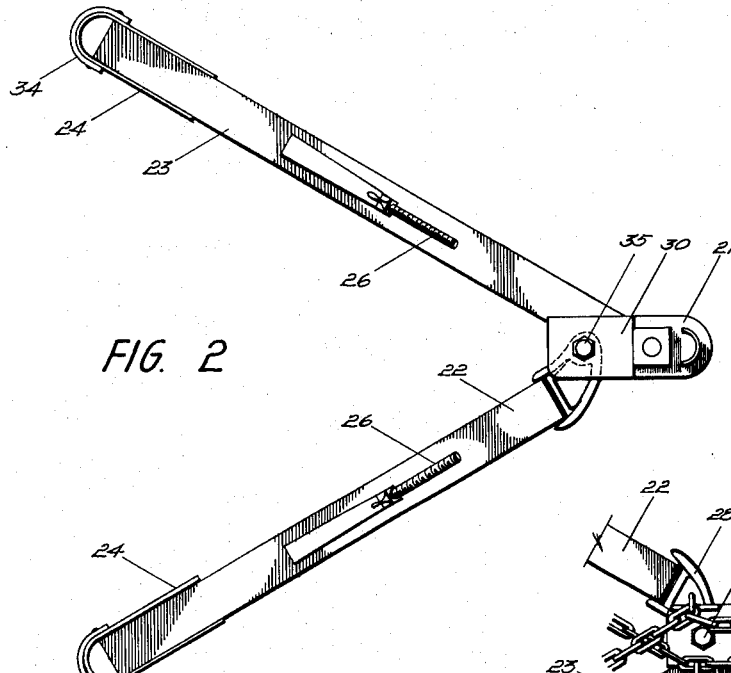

FIG. 2 is a top plan view of the tow bar assembly showing tow bar arm 22 pivoted horizontally with respect to coupling 30 and rigid tow bar arm 23.

Figure 3:
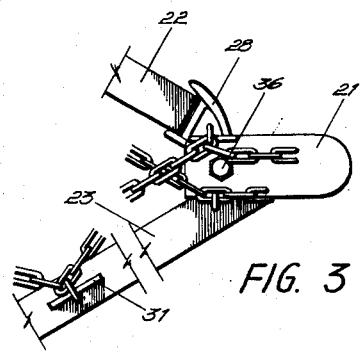

FIG. 3 is a fragmentary bottom plan view showing the intersecting of the safety chain about coupling 30.

Figure 4:
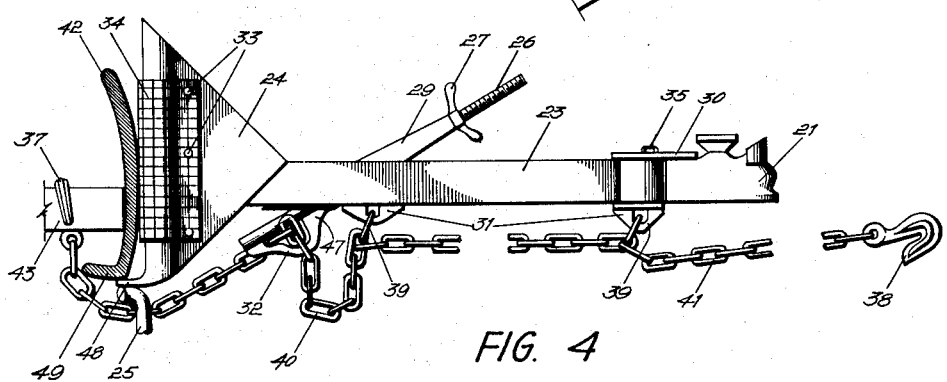

FIG. 4 is a vertical sectional view showing rigid tow bar 23 positioned against towed vehicle bumper 42 and tensioned by means of wing nut 27 engaging bolt 26 which is coupled to chain 45.

Figure 5:
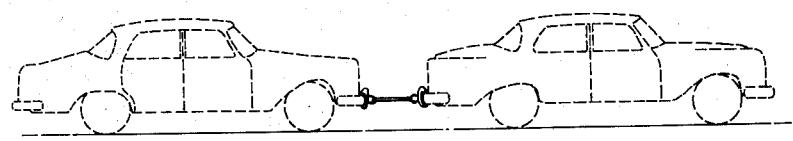
Figure 6:
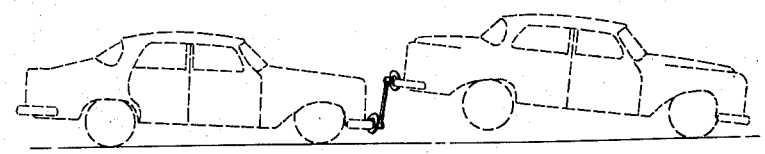

FIGS. 5 and 6 are side elevation sketches, respectively, of towing vehicle and towed vehicle in normal tow and of towing vehicle and towed vehicle jackknifing with respect to one another due to upward thrust imparted in tow bar upon stopping and rise of towing vehicle rear.

In FIG. 1 the tow bar assembly is illustrated as comprising arm 22 horizontally pivoted by means of bracket 28 to cap screw 35 which is secured vertically within coupler extension 30 by means of nut 36. Rigid horizontal ram 23 is also mounted in coupler extension 30 which embodies at its front end concave coupler socket 21. Both arms 22 and 23 have fastened at their bumper abutting ends end plates 24 which may include webbing 34 so as to protect the towed vehicle bumper from scratching. Safety chain 45 is shown as extending substantially the length of both tow bars and including at the towed vehicle end slip hook 37 and at the towing vehicle end grab hook 38.

In FIG. 4 retainer loop means 25 are shown extending downwardly from lower shoulder 48 of end plate 24. Chain tightening bolt 26 is shown as extending through each of the tow bar arms by means of barrel 29 and having affixed at its lower end chain adjustment clip 32. Clip 32 has a graduated lead in edge 47 to insure gradual tightening of the chain and to avoid locking of clip 32 with barrel 29. Chain anchor plates 31 may be positioned forwardly of barrel 29 and rearwardly of coupler 30. Repair or like chain links 39 may be employed for securing the respective chains to the anchor plates. Chain tightening portion 40 of each chain is grasped by clip 32 and is longitudinally tensioned by means of actuation of wing nut 27 upon bolt 26.

In mounting of the device slip hook 37 is clasped over bumper support bars 43, a chain link is fitted over retainer 25 and wing nut 27 is threaded upon bolt 26 so as to tension the chain and drive webbing 34 against the bumper 42 forward surface and end plate lower shoulder 48 beneath the towed vehicle bumper bottom surface 49. Simultaneously or sequentially the safety chain end 41 may be secured by means of grab hook 38 to a similar angle on the towing vehicle.

Principle advantages of the present assembly over conventional devices consist in the horizontal pivotability of the one tow bar arm with respect to the other so as to provide an adjustable spreading intermediate vehicle bumper guards. The provision also of a single pivotable arm reduces the tendency of such arms to collapse during towing. Furthermore, retainer loops 25 while holding the tensioned chains also prevent lateral movability of the arms during the towing operation. Since a bolt and screw are employed for tensioning means the tow bar may be adjusted to the level of the towing car so as to equalize the difference in weights between the towing and towed vehicles. This adjustability feature also enables the towing car operator to provide dynamic hitch adjustments during towing of the vehicle and to equalize for downhill or uphill portions of this trip. The provision also of a single chain interconnecting the towing vehicle bumper support frame and the towed vehicle is in unique conformity with ICC regulations which require crossed towing chains in assemblies of the present type.

Manifestly, various modifications in the tow bar assembly and interchangeability of parts may be employed without departing from the spirit and scope of the invention, as defined in the subjoined claims.

I claim:
1. A tow bar assembly comprising:
   (A) a coupling of the ball socket type;
   (B) at least two tow bars extending divergingly from said coupling and having at their ends opposite said coupling vertically positioned bumper engaging end plates;
   (C) chain means affixed to the bottom of each of said tow bars, extending substantially beyond said tow bars and having at their ends clasping means attached to a towed vehicle frame, said chains being angled downwardly and rearwardly of the tow bar and passing beneath the point of contact of the tow bar with the vehicle bumper; and
   (D) longitudinal threaded bolt tensioning means extending through each of said tow bars and angled downwardly and rearwardly parallel with each of said chains, said bolt tensioning means engaging said chain intermediate the portion affixed to the tow bar and the vehicle attached end, and when actuated away from said vehicle attached end, maintaining said chain in continuous tension to clamp said end plate against said bumper and to impart a continuous downward thrust to the coupling end of said tow bar.

2. A tow bar assembly as in claim 1, wherein one of said tow bars is horizontally pivoted with respect to said coupling.

3. A tow bar assembly as in claim 1, said end plates being adapted for positioning against an automobile bumper and having retainer loops extending from beneath each of said end plates, and said chains passing through said retainer loops.

4. A tow bar assembly as in claim 3, wherein each of said bolt tensioning means includes a barrel extending through said tow bar, a threaded bolt longitudinally actuable within said barrel and extending above and below said tow bar, said bolt having a lower end clip configured for locking with respect to a chain link and a wing nut threaded upon the upper end of said bolt above said tow bar and longitudinally actuating said bolt with respect to said barrel.

5. A tow bar assembly comprising:
   (A) a coupling of the ball socket type;
   (B) at least two tow bars extending divergingly from said coupling and having at their ends opposite said coupling vertically positioned end plates adapted for poistioning against an automobile bumper, each said plate including a lower longitudinally projecting shoulder;
   (C) chain means affixed to the bottom of each said tow bars, extending substantially beyond said tow bars and having at their ends clasping means attached to a towed vehicle frame, said chains being angled downwardly and rearwardly of the tow bar and passing beneath the point of contact of the tow bar with the towed vehicle bumper;
   (D) longitudinal threaded bolt tensioning means including a barrel extending through, above and below each of said tow bars, said barrel being angled downwardly and rearwardly in parallel with each of said chains, a threaded bolt longitudinally actuable within said barrel and extending above and below said tow bar, said bolt having at its lower end a clip engaging an intermediate portion of each of said chains, and having at its upper end above said tow bar a wing nut means threaded for longitudinally actuating each said bolt with respect to said barrel.

References Cited in the file of this patent

UNITED STATES PATENTS

| | | |
|---|---|---|
| 2,693,369 | Gross | Nov. 2, 1954 |
| 2,782,944 | Macklin | Feb. 26, 1957 |
| 2,840,392 | Miles et al. | June 24, 1958 |
| 2,887,325 | Warren | May 19, 1959 |